(12) United States Patent
Walton

(10) Patent No.: US 8,231,325 B1
(45) Date of Patent: Jul. 31, 2012

(54) DEER LOADER

(76) Inventor: Thomas E. Walton, Porterville, MS (US)

( * ) Notice: Subject to any disclaimer, the term of this patent is extended or adjusted under 35 U.S.C. 154(b) by 0 days.

(21) Appl. No.: 13/171,054

(22) Filed: Jun. 28, 2011

(51) Int. Cl.
*B60P 1/54* (2006.01)

(52) U.S. Cl. ........................................... 414/543

(58) Field of Classification Search .................. 414/462, 414/537, 540, 543; 212/294
See application file for complete search history.

(56) References Cited

U.S. PATENT DOCUMENTS

| | | | | |
|---|---|---|---|---|
| 2,562,091 A | * | 7/1951 | Harrison | ........................ 335/107 |
| 3,952,893 A | * | 4/1976 | Kolesar | ........................ 414/462 |
| 4,127,200 A | * | 11/1978 | Mann | ........................ 414/543 |
| 5,662,451 A | | 9/1997 | Muzzi et al. | |
| 5,791,858 A | | 8/1998 | Sasser | |
| 5,975,831 A | | 11/1999 | Martin | |
| 6,155,771 A | | 12/2000 | Montz | |
| 6,202,868 B1 | | 3/2001 | Murray | |
| 6,530,738 B2 | | 3/2003 | Maxwell | |

* cited by examiner

*Primary Examiner* — Charles A Fox

(57) ABSTRACT

A deer loader includes a motor and winch plate attached to a mounting plate, which is preferably attached to a vehicle bed. A vertical stand is pivotally attached to motor and winch plate, with a pivoting arm attached to the top of the vertical stand. A winch is attached to the motor and winch plate, with a motor attached to the winch. A cable is wound around the winch and runs through a series of pulleys on the motor and winch plate, vertical stand, and pivoting arm, with an end mounted hook being attached to the cable.

8 Claims, 5 Drawing Sheets

DEER LOADER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of deer loaders are known in the prior art. However, what is needed is a deer loader that provides power, portability, and ease of use.

FIELD OF THE INVENTION

The present invention relates to a deer loader, and more particularly, to a deer loader that provides features and characteristics above and beyond existing deer loaders that are presently used by individuals.

SUMMARY OF THE INVENTION

The general purpose of the present deer loader, described subsequently in greater detail, is to provide a deer loader which has many novel features that result in a deer loader which is not anticipated, rendered obvious, suggested, or even implied by prior art, either alone or in combination thereof.

To accomplish this, the present deer loader includes a motor and winch plate attached to a mounting plate, which is preferably attached to a vehicle bed. A vertical stand is pivotally attached to motor and winch plate, with a pivoting arm attached to the top of the vertical stand. A winch is attached to the motor and winch plate, with a motor attached to the winch. A cable is wound around the winch and runs through a series of pulleys on the motor and winch plate, vertical stand, and pivoting arm, with an end mounted hook being attached to the cable.

Thus has been broadly outlined the more important features of the present deer loader so that the detailed description thereof that follows may be better understood and in order that the present contribution to the art may be better appreciated.

DETAILED DESCRIPTION OF THE DRAWINGS

Figure 1:
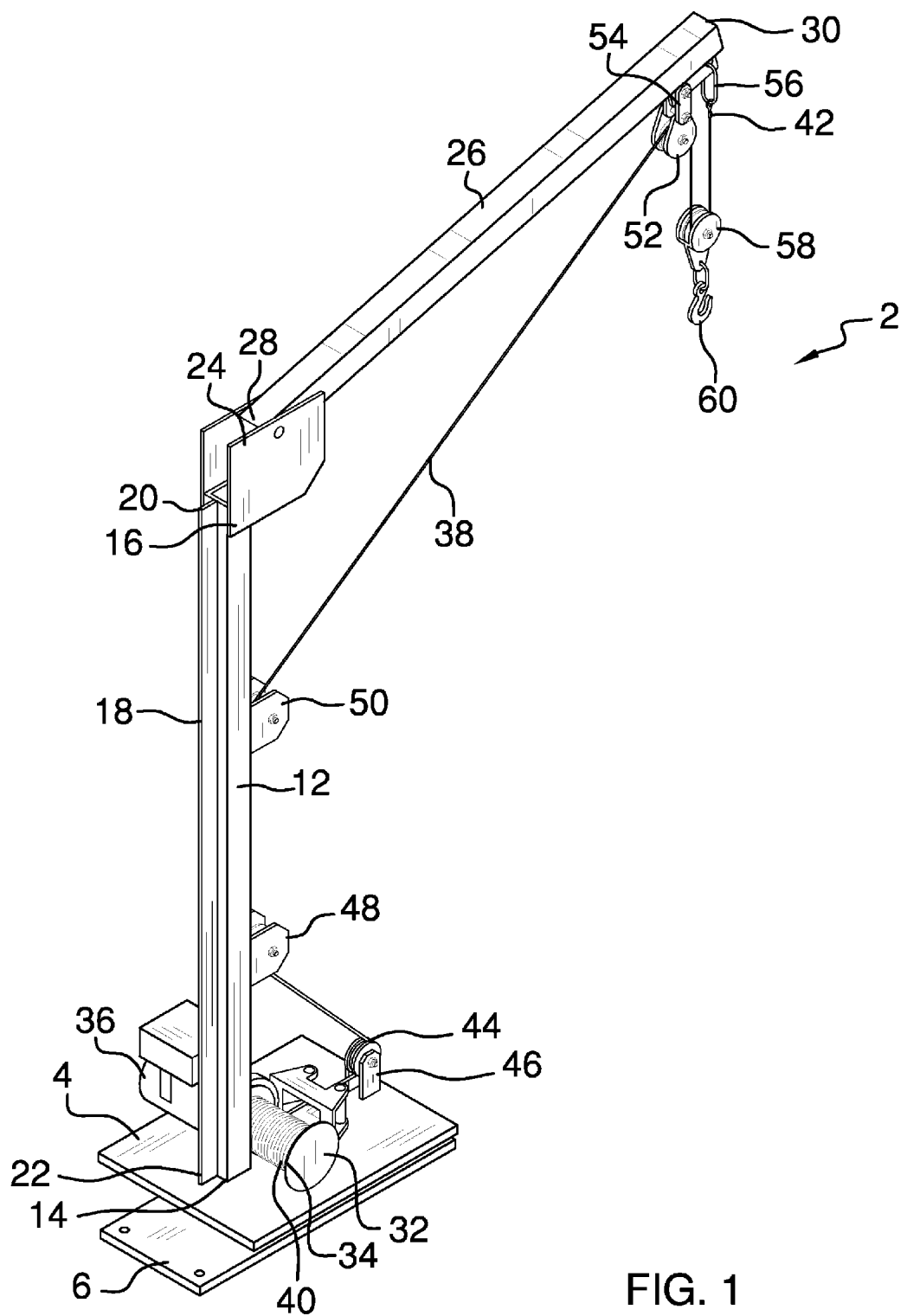
FIG. 1 is a rear perspective view of the deer loader.
Figure 2:
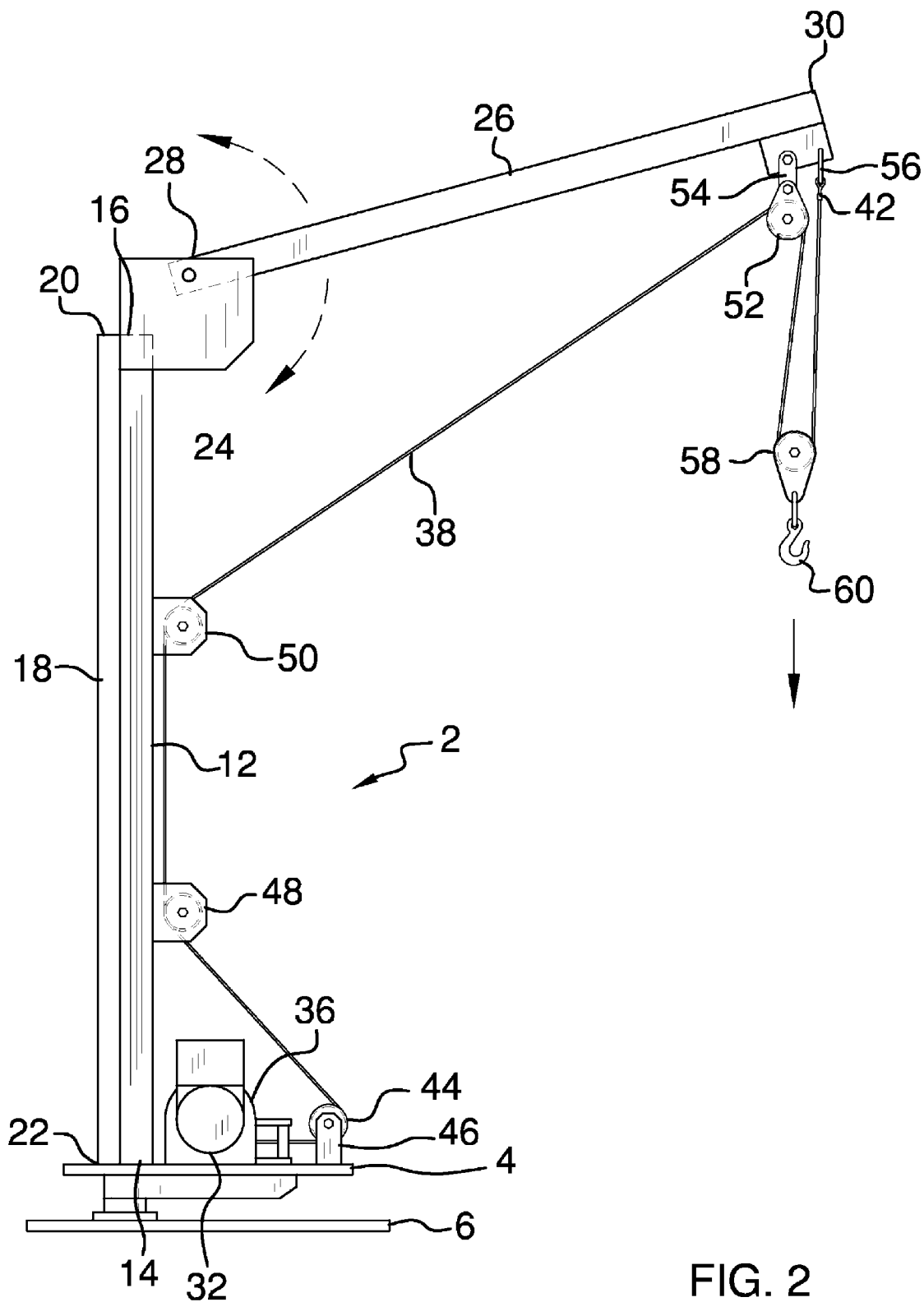
FIG. 2 is a side view of the deer loader.
Figure 3:
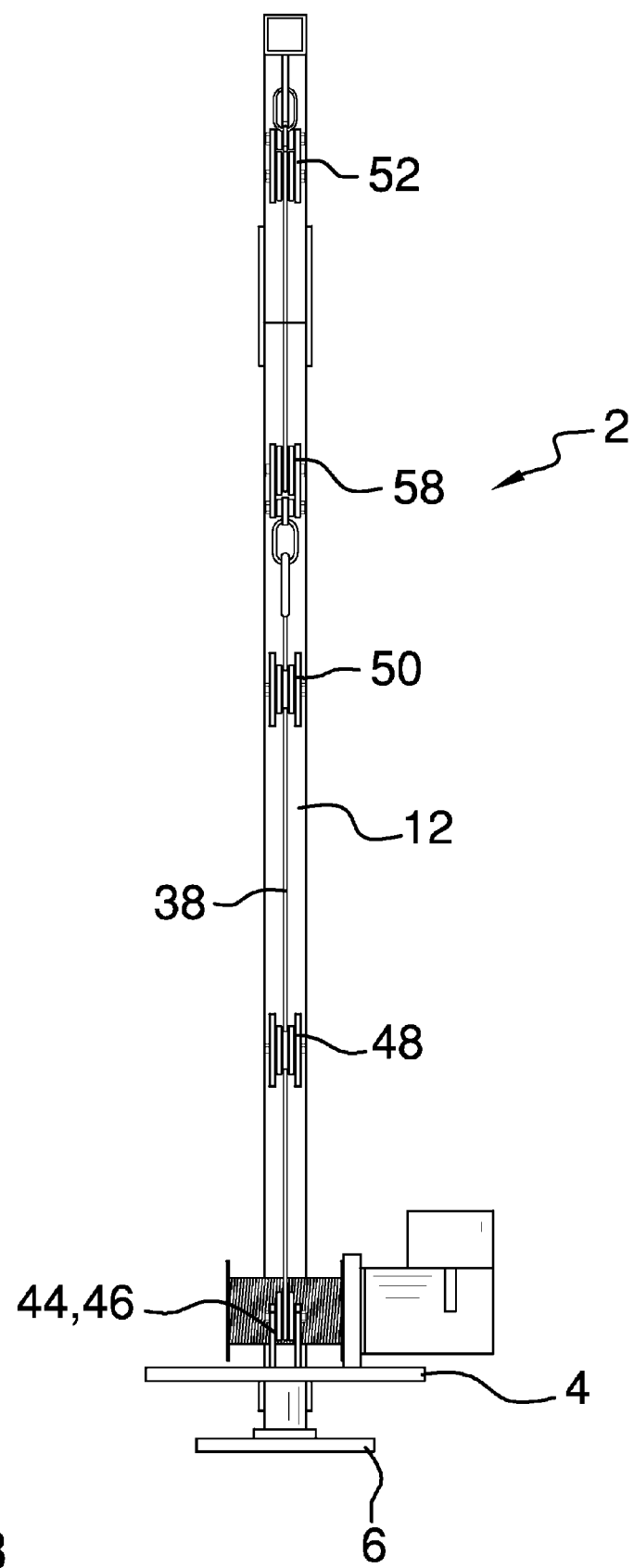
FIG. 3 is a front view of the deer loader.
Figure 4:
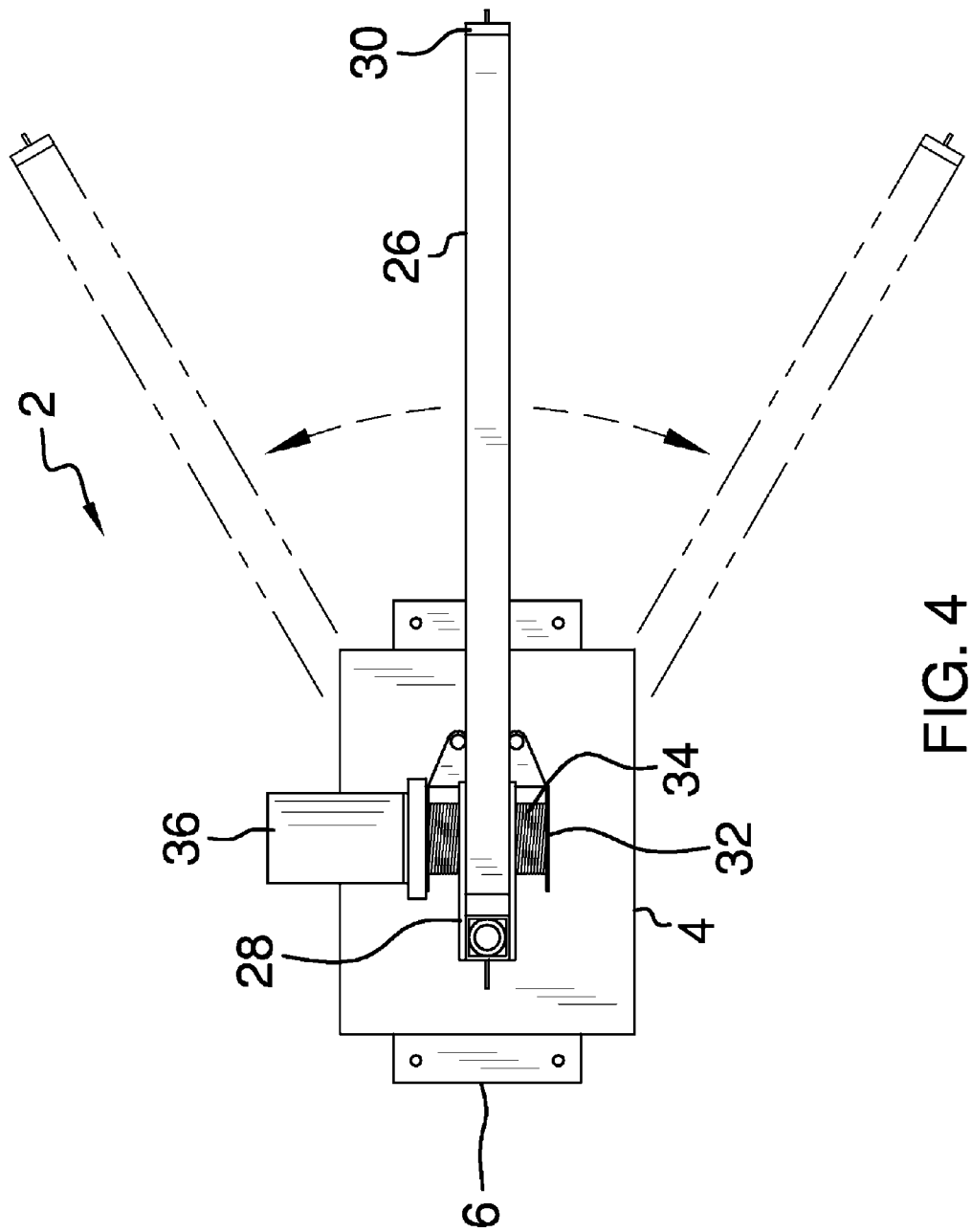
FIG. 4 is a top view of the deer loader.
Figure 5:
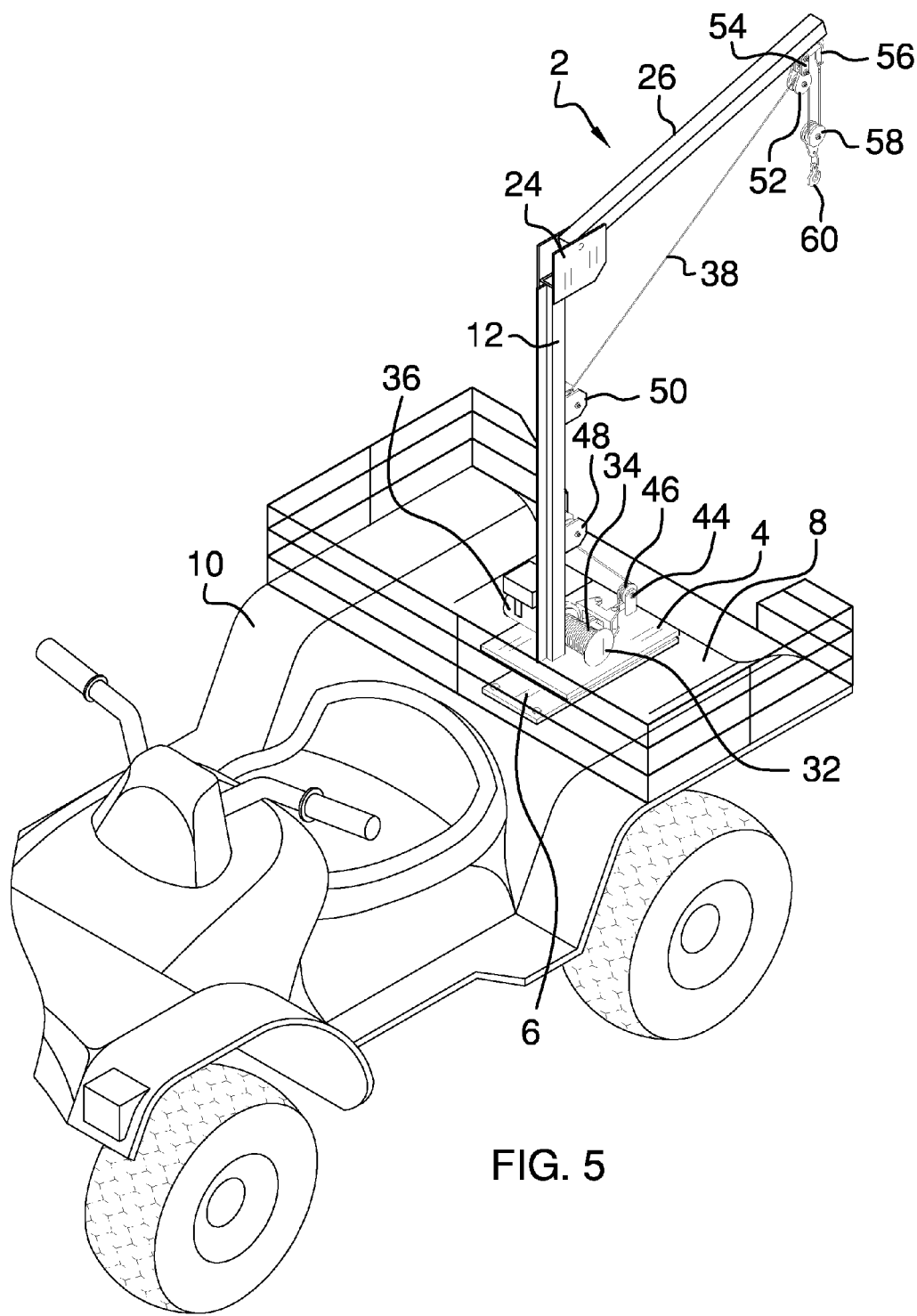
FIG. 5 is a front perspective view of the deer loader as it would be shown mounted to a vehicle bed.

With reference now to the drawings, and in particular FIGS. 1 through 5 thereof, an example of the instant deer loader employing the principles and concepts of the present deer loader and generally designated by the reference number 2 will be described.

Referring to FIGS. 1 through 5, a preferred embodiment of the present deer loader 2 is illustrated. The deer loader 2 includes a motor and winch plate 4 that is fixedly attached to a mounting plate 6, which is preferably fixedly attached to a vehicle bed 8 of a vehicle 10. The bottom end 14 of the vertical stand 12 is pivotally attached to the motor and winch plate 4, with the vertical stand 12 also having a top end 16 as well. The vertical stand 12 is designed to always remain vertical, as it pivots only about its vertical axis.

A stiffening gusset 18 is fixedly attached to the vertical stand 12, with the stiffening gusset 18 having a top end 20 and a bottom end 22. The stiffening gusset 18 provides extra strength and support to the vertical stand 12. The bottom end 22 of the stiffening gusset 18 is not attached to the motor and winch plate 4, allowing the stiffening gusset 18 to always be connected to the vertical stand 12 and move in conjunction with the movement of vertical stand 12.

A mount 24 is attached to the top end 16 of the vertical stand 12. The inner end 28 of a pivoting arm 26 is pivotally attached to the mount, with the pivoting arm 26 also having an outer end 30. The mount 24 is fixedly attached to the top end 16 of the vertical stand 12.

A winch 32 is attached to the motor and winch plate 4 and includes a spool 34, which is attached to a motor 36. The motor 36 is attached to the motor and winch plate 4 adjacent to the winch 32 and rotates the spool 34 of the winch 32 when it is operational. The motor 36 is preferably a fuel-based motor.

A cable 38 is used with the present invention, with the cable 38 having two ends comprising a first end 40 and a second end 42. The first end 40 of the cable 38 is attached to the spool 34 on the winch 32. Moving away from the spool 34, the cable 38 is wound around the spool 34 at least a few times and then travels through a pulley 44 that is attached to the motor and winch plate 4 by a mount 46. The cable 38 then travels through a pair of mounted pulleys 48 and 50 on the vertical stand before looping over toward the outer end 30 of the pivoting arm 26. Mounted pulley 50 is higher on the vertical stand 12 than mounted pulley 48 and is coplanar with mounted pulley 48. The cable 38 then loops through a hanging pulley 52 that hangs from a support 54 which is attached to the pivoting arm 26 near the outer end 30 of the pivoting arm 26. The cable then attaches to a hook 56 which is fixedly attached to the outer end 30 of the pivoting arm 26. The cable 38, in between the hanging pulley 52 and the hook 56, supports an unattached pulley 58 that has an attached hook 60.

In use, an individual can mount objects on the hook 60 and then transport these objects using the vehicle 10 as needed.

What is claimed is:
1. A deer loader in combination with a vehicle, the vehicle including a vehicle bed, wherein the deer loader comprises:
   a mounting plate fixedly attached to the vehicle bed of the vehicle;
   a motor and winch plate fixedly attached to the mounting plate;
   a vertical stand, the vertical stand having two ends comprising a top end and a bottom end, wherein the bottom end of the vertical stand is pivotally attached to the motor and winch plate;
   a pivoting arm having two ends comprising an inner end and an outer end, wherein the inner end of the pivoting arm is pivotally attached to the top end of the vertical stand to pivot about a vertical axis of the vertical stand;

a winch fixedly attached to the motor and winch plate, wherein the winch further comprises a spool;

a motor fixedly attached to the motor and winch plate; wherein the motor is attached to the spool of the winch;

a cable having two ends comprising a first end and a second end, wherein the first end of the cable is attached to the spool;

a plurality of mounted pulleys attached to the deer loader;

further wherein the cable is wound through the plurality of pulleys associated with the deer loader;

further wherein the second end of the cable is fixedly attached to the outer end of the pivoting arm.

2. A deer loader in combination with a vehicle according to claim 1 wherein the plurality of mounted pulleys attached to the deer loader further comprises:

a first mounted pulley, wherein the first mounted pulley is attached to the motor and winch plate;

a second mounted pulley, wherein the second mounted pulley is attached to the vertical stand;

a third mounted pulley, wherein the third mounted pulley is attached to the vertical stand; further wherein the third mounted pulley is attached to the vertical stand at a location higher in elevation than the second mounted pulley;

a hanging pulley, wherein the hanging pulley hangs from a support which is attached to the pivoting arm near the outer end of the pivoting arm;

wherein the cable proceeds to travel through each of the pulleys in sequence while the deer loader is in use;

wherein the second end of the cable is attached to a first hook, wherein the first hook is fixedly attached to the outer end of the pivoting arm.

3. A deer loader in combination with a vehicle according to claim 2 wherein the deer loader further comprises:

an unattached pulley, wherein the unattached pulley is supported by the cable in between the location where the cable travels through the hanging pulley and the second end of the cable is attached to the first hook; and a second hook attached to the unattached pulley.

4. A deer loader in combination with a vehicle according to claim 3 wherein the deer loader further comprises:

a mount, wherein the mount is fixedly attached to the top end of the vertical stand;

wherein the inner end of the pivoting arm is pivotally attached to the mount that is fixedly attached to the top end of the vertical stand.

5. A deer loader in combination with a vehicle according to claim 4 wherein the deer loader further comprises:

a stiffening gusset, the stiffening gusset having two ends comprising a top end and a bottom end, wherein the stiffening gusset is fixedly attached to the vertical stand;

wherein the bottom end of the stiffening gusset is not attached to the motor and winch plate.

6. A deer loader in combination with a vehicle according to claim 5 wherein the motor fixedly attached to the motor and winch plate comprises a fuel-based motor.

7. A deer loader in combination with a vehicle according to claim 2 wherein the second mounted pulley and the third mounted pulley are coplanar with one another.

8. A deer loader in combination with a vehicle, the vehicle including a vehicle bed, wherein the deer loader comprises:

a mounting plate fixedly attached to the vehicle bed of the vehicle;

a motor and winch plate fixedly attached to the mounting plate;

a vertical stand, the vertical stand having two ends comprising a top end and a bottom end, wherein the bottom end of the vertical stand is pivotally attached to the motor and winch plate about a substantially vertical axis of the vertical stand;

a mount, wherein the mount is fixedly attached to the top end of the vertical stand;

a pivoting arm having two ends comprising an inner end and an outer end, wherein the inner end of the pivoting arm is pivotally attached to the mount that is fixedly attached to the top end of the vertical stand;

a winch fixedly attached to the motor and winch plate, wherein the winch further comprises a spool;

a motor fixedly attached to the motor and winch plate; wherein the motor is attached to the spool of the winch, wherein the motor comprises a fuel-based motor;

a cable having two ends comprising a first end and a second end, wherein the first end of the cable is attached to the spool;

a plurality of mounted pulleys attached to the deer loader, wherein the plurality of mounted pulleys further comprises:

a first mounted pulley, wherein the first mounted pulley is attached to the motor and winch plate;

a second mounted pulley, wherein the second mounted pulley is attached to the vertical stand;

a third mounted pulley, wherein the third mounted pulley is attached to the vertical stand; further wherein the third mounted pulley is attached to the vertical stand at a location higher in elevation than the second mounted pulley; further wherein the second mounted pulley and third mounted pulley are co-planar;

a hanging pulley, wherein the hanging pulley hangs from a support which is attached to the pivoting arm near the outer end of the pivoting arm;

wherein the cable proceeds to travel through each of the pulleys in sequence while the deer loader is in use;

wherein the second end of the cable is attached to a first hook, wherein the first hook is fixedly attached to the outer end of the pivoting arm;

an unattached pulley, wherein the unattached pulley is supported by the cable in between the location where the cable travels through the hanging pulley and the second end of the cable is attached to the first hook;

a second hook attached to the unattached pulley;

a stiffening gusset, the stiffening gusset having two ends comprising a top end and a bottom end, wherein the stiffening gusset is fixedly attached to the vertical stand; wherein the bottom end of the stiffening gusset is not attached to the motor and winch plate.

* * * * *